Dec. 15, 1964  B. G. HOOD  3,161,436
PRE-STRESSED MOLDED FOAM CUSHIONING ELEMENT
Filed March 27, 1962  4 Sheets-Sheet 1

INVENTOR
BRUCE G. HOOD

BY Russell, Chittick & Pfund
ATTORNEYS

Dec. 15, 1964     B. G. HOOD     3,161,436
PRE-STRESSED MOLDED FOAM CUSHIONING ELEMENT
Filed March 27, 1962     4 Sheets-Sheet 2

PROCESS A STEPS

1. PREPARE SKIN

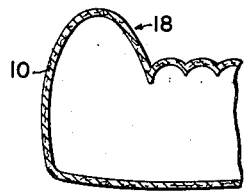

FIG. 6

2. PREPARE FIRST CUSHION ELEMENT

FIG. 7

3. PLACE FIRST CUSHION ELEMENT AND BASE IN SKIN

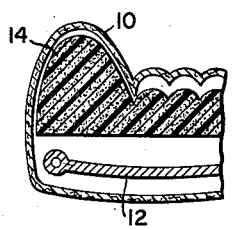

FIG. 8

4. FOAM AND CURE SECOND CUSHION ELEMENT UNDER PRESSURE AGAINST FIRST CUSHION ELEMENT

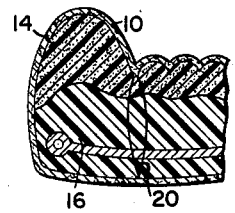

FIG. 9

5. IN FINISHED ARTICLE BOTH CUSHION ELEMENTS REMAIN IN COMPRESSION

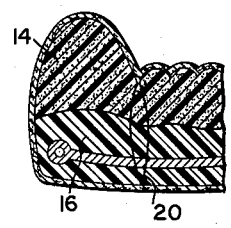

FIG. 10

INVENTOR
BRUCE G. HOOD

BY Russell, Chittick & Pfund
ATTORNEYS

Dec. 15, 1964    B. G. HOOD    3,161,436
PRE-STRESSED MOLDED FOAM CUSHIONING ELEMENT
Filed March 27, 1962    4 Sheets-Sheet 3

PROCESS B
STEPS

1  SPRAY MOLD SKIN IN
   HOT MOLD

2  PAINT IN MOLD RELEASE

3  FOAM AND CURE FIRST
   CUSHION ELEMENT IN
   PLACE - OPEN MOLD

4  INSERT BASE AND BACKER
   IN MOLD - CLOSE MOLD AND
   THEN FOAM AND CURE
   SECOND CUSHION ELEMENT
   UNDER PRESSURE

INVENTOR
BRUCE G. HOOD

BY *Russell, Chittick, & Pfund*
ATTORNEYS

Dec. 15, 1964     B. G. HOOD     3,161,436
PRE-STRESSED MOLDED FOAM CUSHIONING ELEMENT
Filed March 27, 1962     4 Sheets-Sheet 4

PROCESS C
STEPS

1 & 2 SAME AS FIGURES 11 & 12

3   PLACE FIRST CUSHION ELEMENT IN MOLD IN COLLAPSED STATE IN EVACUATED ENVELOPE AND FOAM IN PLACE SECOND CUSHION ELEMENT

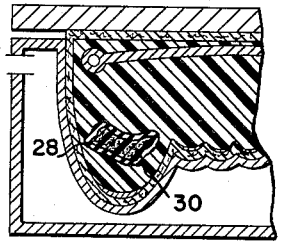

FIG. 15

4   REMOVE FROM MOLD AND PIERCE ENVELOPE ALLOWING FIRST CUSHION ELEMENT TO EXPAND

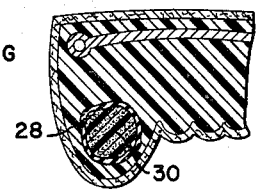

FIG. 16

PROCESS D
STEPS

1 & 2 SAME AS FIGURES 11 & 12

3   COLLAPSE FIRST CUSHION ELEMENT BY VACUUM BACK AND FOAM IN PLACE SECOND CUSHION ELEMENT

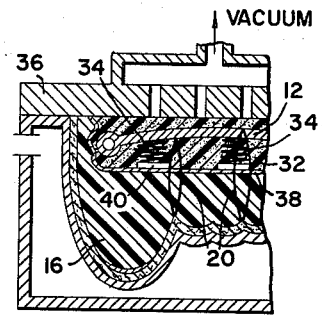

FIG. 17

4   RELEASE VACUUM AND REMOVE FROM MOLD

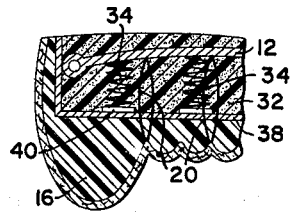

FIG. 18

INVENTOR
BRUCE G. HOOD

BY *Russell, Chittick & Pfund*
ATTORNEYS

| United States Patent Office | 3,161,436 |
|---|---|
| | Patented Dec. 15, 1964 |

3,161,436
PRE-STRESSED MOLDED FOAM CUSHIONING ELEMENT
Bruce G. Hood, Marblehead Neck, Mass., assignor to Davidson Rubber Company Incorporated, a corporation of Delaware
Filed Mar. 27, 1962, Ser. No. 183,343
17 Claims. (Cl. 297—460)

This invention relates to padded elements or articles, and to a method for producing them. More particularly, this invention relates to unitary molded padded structures having compressed resilient cushioning elements therein and an outer covering or skin which is free to shift slightly in relation to the cushioning elements.

A typical illustration of an article made in accordance with this invention is the seat portion or back rest of an automobile seat, and while this invention is clearly not limited to such, it will be convenient to refer to the same herein for purposes of illustration and discussion.

It has been found preferable in articles of this sort to provide a relatively loose skin covering the cushioning elements and then to pretension the skin over the cushioning elements in such a way as to compress the resilient spring or foam cushioning elements within the structure. In this way the surface of the cushion is firm, but does not at the same time feel hard to the touch. The conventional techniques for making such articles are quite costly and involve much manual labor in the preparation of the various components, such as the skins, the cushioning elements, the springs, the back frames, etc; also assembling the components and tensioning the skins or coverings over the springs and cushioning elements is conventionally done by hand. In addition, the structure which results from the conventional techniques also has certain drawbacks in that it is not a unitary structure. Thus after extended use, if the seams pull loose, since the components of the structure are not permanently interconnected, they can thereafter fall apart. Also the fact that the component parts in the conventional structures are not integrally connected in mutually supporting and reinforcing relation, means that each component must be individually stronger and hence more expensive for the entire structure to meet the required performance standards.

Accordingly it is a general object of my invention to eliminate certain costly manually operated steps conventionally employed in the production of loose skinned, pretensioned cushioned articles. Another object is to form articles of this type in such a way that they result in a completely unitary structure having substantially all of its components except certain portions of the skin integrally interconnected and in mutually supporting and reinforcing relation.

In the accomplishment of these and other objects of my invention in a preferred embodiment thereof, I incorporate the various components of a padded or cushioned article, such as the back rest of an automobile seat, into a unitary structure by a molding operation and I compress the resilient spring elements within the structure all at the same time and essentially without manual operation. This is done in my invention by forming a substantially non-stretching cover or skin member of substantially the desired contour of the finished article, placing a first resilient cushioning element in the skin in the areas thereof where the "loose skin" effect is desired, thereafter placing in the skin an essentially rigid base or frame member, and finally introducing, foaming and curing in place under pressure a second cushioning element of the expanding urethane foam type. In this way the expansion of the foam of the second cushioning element during foaming and curing substantially compresses the first cushioning element, and at the same time it bonds the skin to the base and the cushioning elements together into an integral unified structure in which the various components remain in supporting and reinforcing relation to each other. When the foam of the second cushioning element is cured with the first cushioning element in the compressed state, it thereafter tends to remain in the position in which it was cured such that the two cushioning elements thereafter continue to exert a compressive force against each other, which in turn is communicated through the cushioning elements to the skin. However, since the skin is not bonded to the first cushioning element in the areas where the "loose skin" effect was desired, in this portion, and only in this portion, of the structure are the elements not integrally bonded.

It is a feature of my invention that the first cushioning element may either be contoured to the shape of the skin or may be formed by loose pieces of pre-cured foam. A further feature relating to the first cushioning element is that it may be additionally compressed by containing it within an evacuated envelope or membrane during the foaming operation of the second cushioning element.

A further feature of my invention is that the first cushioning element may be molded in contact with the skin and that the "loose skin" effect may be accomplished by interposing a mold release compound between the first said cushioning element and the skin in the areas where such effect is desired.

Another feature of my invention relating to the skin thereof is that expensive laminated upholstery fabrics need not be employed as long as they are sufficiently non-stretching to hold the resilient cushioning elements under compression throughout the normal life of the article. Thus my invention contemplates the use of relatively firm sheet material of the plastisol type formulated in such a way that it has relatively high resistance to cold flow. In addition, such materials may be fabric reinforced or laminated as desired. Of course, woven fabrics, leather and other natural and synthetic highly flexible essentially non-stretching materials are equally useful. The advantage, however, of typical moldable thermoplastic or flexible thermosetting resins is that they may be molded to the desired contour of the article thereby obviating the more expensive and complex steps involved in cutting and fabricating a contoured skin from non-stretching flat woven cured sheet material. Still another feature of my invention relates to the bonding effect of forming the second cushioning element in place together with the base frame of the article and the backer therefor if such is used. By curing the resinous foam of the second cushioning element in contact with the various associated elements, they all are thereby integrally bonded and interconnected into a unitary structure without any further need for securing the skin to the base frame or the frame to the cushions, etc. by means of tacks, staples, screws, zippers, eyelets, or other conventionally employed means for securing the upholstery coverings to the basic structure.

Further objects and features of my invention will best be understood with reference to the following description of the details of preferred embodiments of my invention, selected for purposes of illustration, and shown in the accompanying drawings, in which:

FIGS. 6–10 illustrates consecutively the steps taken while performing the process of my invention in one embodiment thereof designated as Process A;

Figure 11:
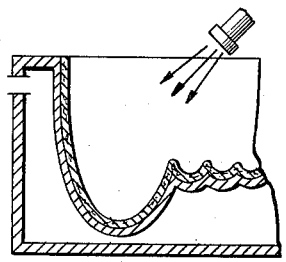
FIGS. 11–14 illustrate consecutively the steps taken while performing the process of my invention in a second embodiment thereof designated as Process B.
Figure 12:
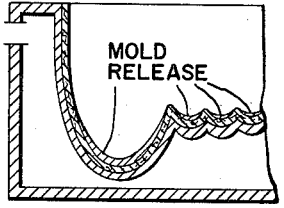
Figure 13:
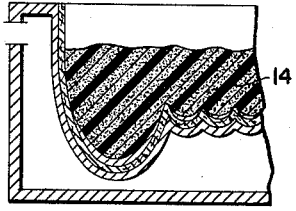
Figure 14:
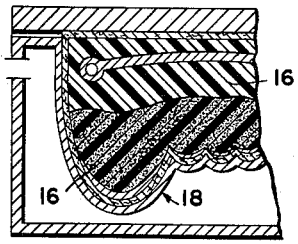

FIGS. 15 and 16 combine with FIGS. 11 and 12 to illustrate the steps of another embodiment of my invention designated Process C; and FIGS. 17 and 18 combine with FIGS. 11 and 12 to illustrate the steps of still another embodiment designated Process D.

The most basic step employed in the practice of the preferred embodiments of my invention herein shown is that of compressing a first resilient cushioning element within a confined space which represents the shape of the finished article while foaming and curing a second cushion-element adjacent to the said first cushioning element in the confined space. In this way the second cushioning element adapts itself during curing to the contour assumed by the first cushioning element in its compressed state. Thus after the curing of the second cushioning element, and the release of the first cushioning element, both of the said elements thereafter remain under compression in the finished article.

Figure 1:
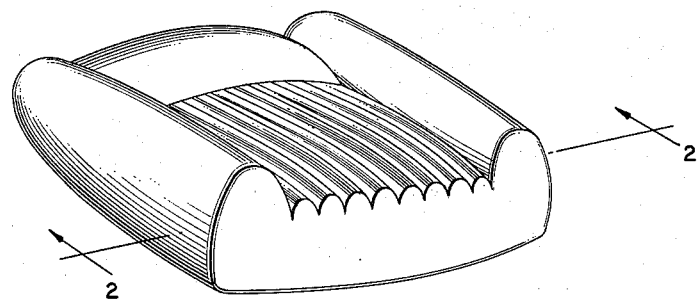
FIG. 1 is a representative view in perspective of a finished article made in accordance with the process of my invention.
Figure 2:
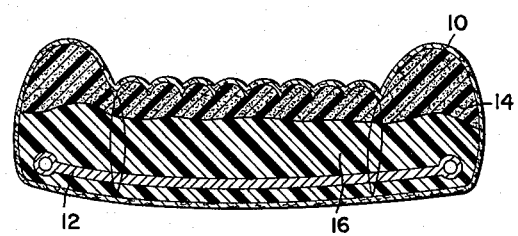
FIG. 2 is a view in cross section taken along the lines 2—2 of FIG. 1.

Accordingly with reference to FIG. 2, in one embodiment of my invention it will be seen that the article may comprise in its general structure a skin or cover element 10, an internal base member or frame 12, a first cushioning element 14 and a second cushioning element 16. These elements may be combined in accordance with the steps of Process A indicated in FIGS. 6–10. Thus the skin 10, as shown in FIG. 6, may be formed in any suitable fashion as by rotationally molding a vinyl plastisol shell with grain marks on the surface or by conventional upholstery covering fabricating techniques for other forms of upholstery covering, including leather, leather and fabric laminations, or synthetic and fabric laminations. Any of these combinations are suitable as long as the material is substantially resistant to permanent elongation under pressure. In addition to rotational molding, it is possible to form such shells from synthetic thermoplastic or thermosetting resins by means of slush molding, spray molding, or vacuum forming.

The second step in Process A as indicated at FIG. 7 comprises the formation of a first cushioning element 14 which is intended to fit in the skin 10 in the area thereof designated at 18 in FIG. 6 where it is desired to have a "loose skin" effect. In the third step (see FIG. 8) the first cushioning element 14 is inserted in place in the skin 10 and the base member or frame 12 is likewise inserted in place. The fourth step shown in FIG. 9 includes introduction into the skin of a synthetic foam forming material, for instance of the polyurethane type, to provide a second cushioning element 16. The said foam forming materials are reacted in the mold so as to foam and expand outwardly while curing. As shown in FIG. 9 the skin 10 need not be supported by a retaining mold during the expansion of the foam of the second cushioning element 16 as long as retaining elements, such as hog rings indicated at 20 in FIG. 9, are employed. As shown, the compression of the foam in the large end area is greatest and only one hog ring 20 is shown. Thus with the steps of Process A skin 10 and hog rings 20 can by themselves serve as a retaining mold.

Internally of the skin 10 during the foaming and curing of the second cushioning element 16, the first cushioning element 14 is drastically compressed as shown by the curved division line in FIG. 9. Although the skin 10 in FIG. 9 is indicated as entirely surrounding the articles, it will be understood, of course, that means are provided to permit the escape of gas during the expansion of the foam of the second cushioning element 16. After the molding pressure of the form of cushioning element 16 releases, then the resilient compressive force of the first cushioning element 14 urges the cushioning element 16 backwardly to some extent, but both of the said cushioning elements 14 and 16 thereafter remain in compression, and since the cushioning element 14 is not secured or bonded to the skin 10 in the area 18, the finished article has the "loose skin" effect where the same is desired.

While the steps of Process A employ the basic concept of my invention as described, certain further advantages, however, may be obtained by employing a retaining mold as shown in FIGS. 11–14, to hold the shape of the article during the foaming operation of Process A. The use of a retaining mold, however, provides certain additional advantages as may be seen in the steps indicated for Process B in FIGS. 11–14.

In Process B the skin may be formed directly in the mold by spray molding techniques. Thereafter a mold release may be painted on the inside of the skin in the areas where the so-called "loose skin" effect is desired as shown in FIG. 12. The next step in Process B is to introduce and foam in place the resilient first cushioning element 14. Finally the foam forming materials of the second cushioning element 16 are introduced into the mold, a frame member 12 is applied thereto and the mold is closed. In Process B as the foam of the second cushioning element 16 expands it compresses the foam of the first cushioning element (see FIG. 14) and the entire structure is cured to form a strong integrally bonded unit in which all the elements are connected together in mutually supporting and reinforcing arrangement with the exception of the area 18 where the "loose skin" effect is desired.

Process C shown in FIGS. 15 and 16, employs the first two steps of Process B (see FIGS. 11 and 12). Thereafter a rubber or polyethylene (or the like) envelope 28 is filled with foam 30 which may be molded in place in the envelope or may comprise pieces of loose foam, such as sponge or foam rubber, vinyl, or urethane, or the like. The envelope 28 is then evacuated to collapse the foam 30, sealed, and placed in the mold within the skin. The second cushioning element 16 is then foamed in place in the mold as shown in FIG. 15. After the foam of the second cushioning element 16 has cured, the envelope 28 is pierced in several places with a needle and allowed to expand as shown in FIG. 16 in order to pretension the skin. An advantage of this construction is that no hog rings are required. While Process C obtains some of its pretensioning by the compressive effect on the foam 30 of the expansion of the foam of the second cushioning element 16, it will be understood that the major part of the pretensioning in Process C is obtained by evacuating the envelope 28 prior to placing the first cushioning element in the mold.

Process D is similar to Process C in that it too employs vacuum. In Process D, a skin is formed and placed in a retaining mold as shown, for instance, in FIGS. 11 and 12. A first foam cushioning element 32, containing a base frame member 12 and/or springs 34 molded into its structure, is placed on a vacuum back 36 and covered with a membrane 38. A vacuum is then drawn on the vacuum back 36 which collapses the first cushioning element 32. The second cushioning element 16 is then introduced into the skin, and the vacuum back 36 is placed over the mold after hog rings 20 have been attached. After molding, the release of the vacuum permits the cushioning element 32 to spring back and pretension the structure. A mold release may be employed to give the "loose skin" effect as desired. When springs 34 are employed, a semi-rigid element 40 is also employed to help collapse the springs 34 and to retain them in place during use.

A suitable "one shot" urethane foam for use in the cushioning elements of this invention is disclosed on page 4 of my copending application Serial No. 82,548, filed on January 13, 1961.

In the practice of my invention in its various embodiments, the first cushioning element always receives pressure on at least one surface thereof, while the second cushioning element is being foamed and cured, and for convenience of reference in the claims, I will refer to this surface as the "pre-stress pressure receiving surface." Also the article itself is generally designed to have the "loose skin" effect in the area thereof where a person sits, places his hand, or otherwise presses against the article, and therefore, I will refer in the claims to this area of the article as the "pressure and wear receiving surface."

Figure 3:
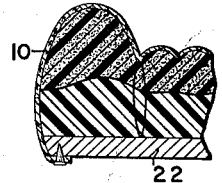
FIG. 3 is a fragmentary view in cross section of a side portion of the elements shown in FIG. 2 showing the skin of the article secured to a wood back by means of tacks, but incorporating internally the features of my invention.
Figure 4:
FIG. 4 is a fragmentary view in cross section of a portion of FIG. 2 illustrating the use of a membrane separating the first and second cushioning elements.
Figure 5:
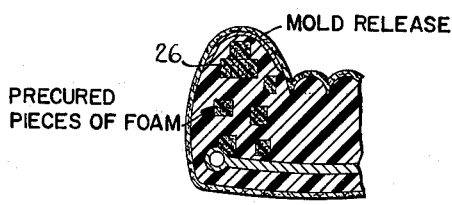
FIG. 5 is a fragmentary view in cross section of a portion of FIG. 2 illustrating the use of pre-cured pieces of foam for the first cushioning element.

In accordance with my invention certain variations will now be apparent to those skilled in the art, such as the use of a rigid pre-formed outer backing member as indicated at 22 in FIG. 3 with the skin 10 being attached thereto by nails or other conventional attaching means. Another variation is the use of a membrane 24 to separate the first cushioning element 14 and the second cushioning element 16 as shown in FIG. 4. This membrane may be prefabricated or formed in place by spraying techniques or the like. A third variation is the use of pre-cured pieces of foam 26 as indicated in FIG. 5. Also it should be noted that similar pre-cured pieces of foam may be used in Processes B and C. By this technique foam waste from other processes may be reclaimed, and accordingly I regard this as highly advantageous, and intend to claim it independently of the other steps described above. Accordingly it is not my intention to confine the coverage of this invention to the precise form herein shown, but rather to limit it in terms of the appended claims.

Having thus shown and described preferred embodiments of my invention, what I claim as new and desire to secure by Letters Patent of the United States is:

1. A molded article comprising; a substantially rigid base member; a substantially flexible non-stretchable skin member overlying and spaced from said base member and defining a cushion receiving cavity between said skin and said base; said skin member having a pressure and wear receiving surface; a first resilient cushioning element in said cavity having an outer surface comprised in part of at least one pre-stress pressure receiving surface, said first cushioning element filling only a portion of said cavity with said outer surfaces other than said pre-stress pressure receiving surface in contact with said skin, said skin being free from adhesion to said outer surfaces of said first resilient cushioning element in the area thereof corresponding to said pressure and wear receiving surface; and a second cushioning element comprising resilient resinous foam filling the entire remainder of said cavity and adhering to said pre-stress pressure receiving surface, said base and said skin in order to provide a unitized construction therebetween said second cushioning element cured to the contour defined by said cavity with said first cushioning element substantially compressed by pressure applied thereby against said pressure receiving surface, whereby both of said cushioning elements remain in resilient compression against said skin within said article.

2. A molded article comprising: a substantially rigid base member; a substantially flexible non-stretchable skin member overlying and spaced from said base member and defining a cushion receiving cavity between said skin and said base; said skin member having a pressure and wear receiving surface; a first resilient cushioning element in said cavity comprising an essentially soft resilient cured thermosetting resinous foam structure having outer surfaces comprised of at least one pre-stress pressure receiving surface, said first cushioning element filling only a portion of said cavity with said outer surfaces other than said pre-stress pressure receiving surface in contact with said skin, said skin being free from adhesion to said outer surfaces in the area thereof corresponding to said pressure and wear receiving surface; and a second cushioning element comprising resilient resinous foam filling the entire remainder of said cavity in order to adhere to said pre-stress pressure receiving surface, said base and said skin and thereby provide a unitized construction therebetween; said second cushioning element cured to the contour defined by said cavity, said first cushioning element substantially compressed by pressure applied by said second cushioning element against said pressure receiving surface, whereby both of said cushioning elements remain in resilient compression against said skin within said article.

3. The molded article defined in claim 1 further characterized by said first cushioning element comprising at least one pre-cured piece of resilient resinous foam.

4. The molded article defined in claim 1 further characterized by said first cushioning element comprising a spring together with at least semi-rigid means for covering said spring and providing said pre-stress pressure receiving surface therefor.

5. The molded article defined in claim 1 further characterized by said first cushioning element comprising a multiplicity of pieces of pre-cured resilient foam scraps.

6. The molded article defined in claim 1 further characterized by said first cushioning element comprising a resinous plastic foam, and means including a membrane separating said first cushioning element from said second cushioning element.

7. The molded article defined in claim 1 further characterized by said first cushioning element comprising a resinous plastic foam molded to the inside contour of said skin in the area corresponding to said pressure and wear receiving surface.

8. The molded article defined in claim 1 further characterized by said skin being free from adhesion to said cushioning elements in the area thereof corresponding to said pressure and wear receiving surface.

9. The molded article defined in claim 1 further characterized by said second cushioning element entirely surrounding said first cushioning element.

10. The molded article defined in claim 1 further characterized by said second cushioning element entirely surrounding said first cushioning element, said skin being free from adhesion to said cushioning elements in the area thereof corresponding to said pressure and wear receiving surface.

11. A process for molding articles comprising the steps of: forming a substantially non-stretching skin to define a hollow cushion receiving cavity; placing in said cavity a first cushioning element comprising a resilient resinous foam in quantity sufficient to fill only a part of said cavity; reacting and expanding and curing a resinous resilient foam to form a second cushioning element in the remainder of said cavity while compressing said first cushioning element.

12. A process for molding articles having a pressure and wear receiving surface comprising the steps of: forming an essentially non-stretchable skin of the outer contour of the article; placing a first cushioning element within a portion of said skin in a non-adhering relationship thereto in the area of said pressure and wear receiving surface, said first cushioning element having a pre-stress pressure receiving surface; expanding foaming and curing a second cushioning element in said skin in quantities sufficient to fill all voids therein, said second cushioning element in adhering relationship with said first cushioning element at said pre-stress pressure receiving surface and said skin, thereby providing a unitized construction therebetween.

13. The process of claim 12 further characterized by compressing said first cushioning element at least in part by the pressure of expansion of the foam of said second cushioning element.

14. The process of claim 12 further characterized by compressing said first cushioning element entirely by the pressure of expansion of the foam of said second cushioning element.

15. The process of claim 12 further characterized by compressing said first cushioning element at least in part by vacuum pressure of expansion of the foam of said second cushioning element.

16. The process of claim 12 further characterized by separating said first and second cushioning elements by a membrane and thereafter compressing said first cushioning element by drawing a vacuum on it within said membrane.

17. A process for molding articles having a pressure and wear receiving surface comprising the steps of: forming an essentially non-stretchable skin of the outer contour of the article; placing a first cushioning element in a pre-compressed state within a portion of said skin; said first cushioning element having a pre-stress pressure receiving surface; while said first cushioning element remains in said pre-compressed state, expanding, foaming and curing a second cushioning element in said skin in quantities sufficient to fill all voids therein, said second cushioning element in adhering relationship with both said first cushioning element at said pre-stress pressure receiving surface and said skin in areas other than the area of said pressure and wear receiving surface, thereby providing a unitized construction therebetween; and thereafter releasing said first cushioning element from said pre-compressed state; whereby an article is formed in which both of said cushioning elements remain in resilient compression against said skin within said article.

References Cited in the file of this patent

UNITED STATES PATENTS

| | | |
|---|---|---|
| 2,838,100 | Follows | June 10, 1958 |
| 2,845,997 | Waite | Aug. 5, 1958 |
| 2,948,651 | Waag | Aug. 9, 1960 |
| 2,980,167 | Harris et al. | Apr. 18, 1961 |
| 2,989,112 | Sonnleitner | June 20, 1961 |

FOREIGN PATENTS

| | | |
|---|---|---|
| 858,246 | Great Britain | Jan. 11, 1961 |